(12) United States Patent
Guu (10) Patent No.: US 6,481,337 B1
(45) Date of Patent: Nov. 19, 2002

(54) CONTROLLING MECHANISM OF BEVERAGE INFUSION CONTAINER

(76) Inventor: Chuen Lan Guu, No. 15, Hsi An Lane, Pu-Li Chen, Nan-Tou Hsien (TW)

( * ) Notice: Subject to any disclaimer, the term of this patent is extended or adjusted under 35 U.S.C. 154(b) by 0 days.

(21) Appl. No.: 10/153,780

(22) Filed: May 24, 2002

(51) Int. Cl.[7] ............................. A23L 1/00; A47J 31/02
(52) U.S. Cl. ............................ 99/285; 99/297; 99/299; 99/306; 99/323; 99/495
(58) Field of Search ..................... 99/495, 452, 453, 99/285, 299, 297, 304–306, 317, 319, 279, 323, 323.3; 210/474, 477–479, 181; 426/433, 435, 432, 429

(56) References Cited

U.S. PATENT DOCUMENTS

| | | | | |
|---|---|---|---|---|
| 3,631,793 A | * | 1/1972 | Bednartz ...................... | 99/295 |
| 3,724,359 A | * | 4/1973 | Masters et al. ............... | 99/281 |
| 5,125,327 A | * | 6/1992 | Winnington-Ingram ...... | 99/306 |
| 5,632,193 A | * | 5/1997 | Shen ........................... | 99/285 |
| 5,632,194 A | * | 5/1997 | Lin .............................. | 99/285 |
| 5,813,317 A | * | 9/1998 | Chang ......................... | 99/285 |
| 5,913,964 A | * | 6/1999 | Melton ........................ | 99/322 |
| 5,924,354 A | * | 7/1999 | Court et al. .................. | 99/318 |
| 5,943,946 A | * | 8/1999 | Chen ............................ | 99/297 |
| 5,947,004 A | * | 9/1999 | Huang .......................... | 99/289 |
| 6,164,190 A | * | 12/2000 | Tien Lin ...................... | 99/299 |
| 6,279,460 B1 | * | 8/2001 | Pope ............................ | 99/299 |
| 6,327,965 B1 | * | 12/2001 | Lin Tien ...................... | 99/299 |

* cited by examiner

Primary Examiner—Timothy F. Simone
(74) Attorney, Agent, or Firm—Rosenberg, Klein & Lee (57) ABSTRACT

A controlling mechanism of beverage infusion container. The container includes a partitioning board transversely disposed therein to divide the interior of the container into a first division and a second division. Each division has an opening provided with a cover. The partitioning board is formed with a central draining hole communicating the first division with the second division. The blocking/unblocking of the draining hole is controlled by a controlling mechanism. The controlling mechanism includes a controlling member passed through the circumferential wall of the container. One end of the controlling member extends out of the circumferential wall and is provided with a controlling section. The other end of the controlling member is linked with a valve body positioned at the draining hole of the partitioning board. The valve body is controllable by the controlling section on outer side of the container to block or unblock the draining hole.

4 Claims, 9 Drawing Sheets

CONTROLLING MECHANISM OF BEVERAGE INFUSION CONTAINER

BACKGROUND OF THE INVENTION

The present invention is related to a controlling mechanism of beverage infusion container. By the controlling mechanism, a user can from outer side of the container control the communication between two divisions of the interior of the container.

Figure 5:
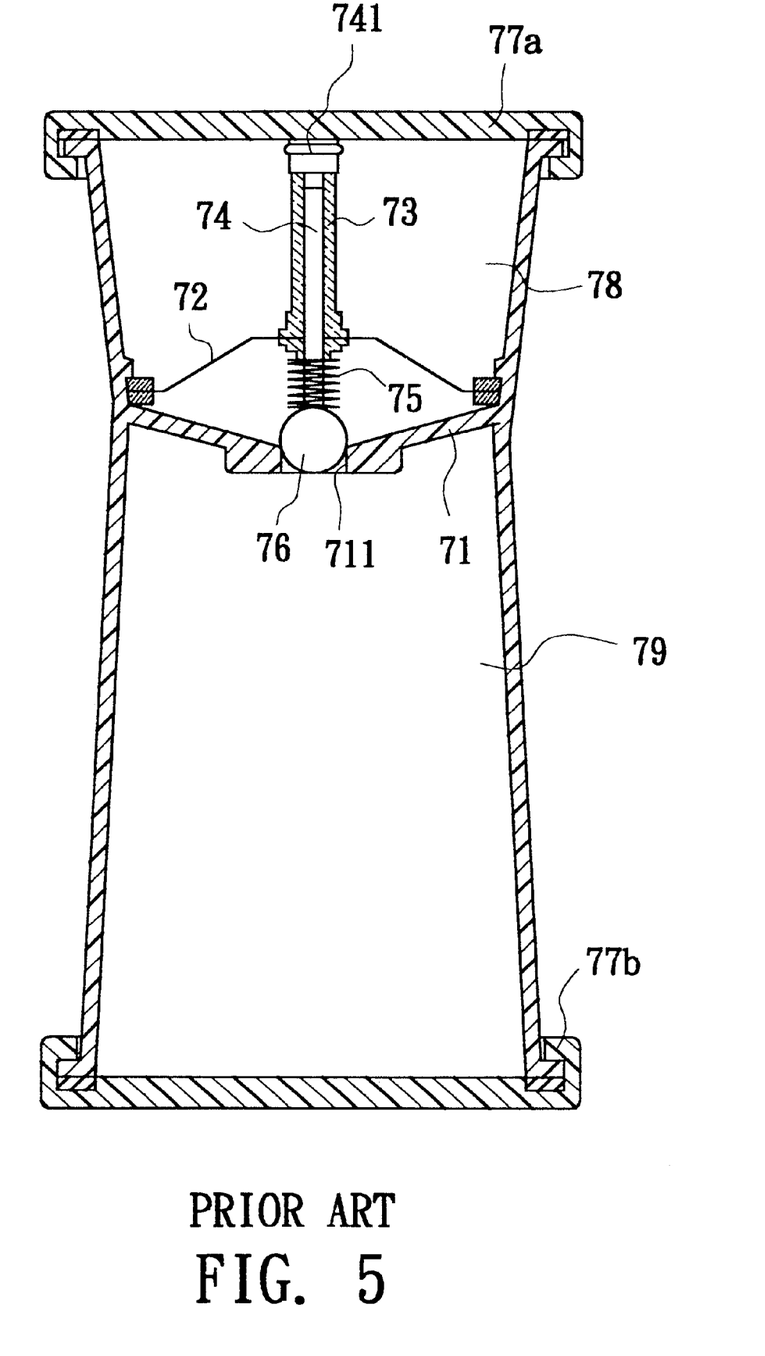
FIG. 5 is a sectional view of a conventional tea infusion cup.
Figure 6:
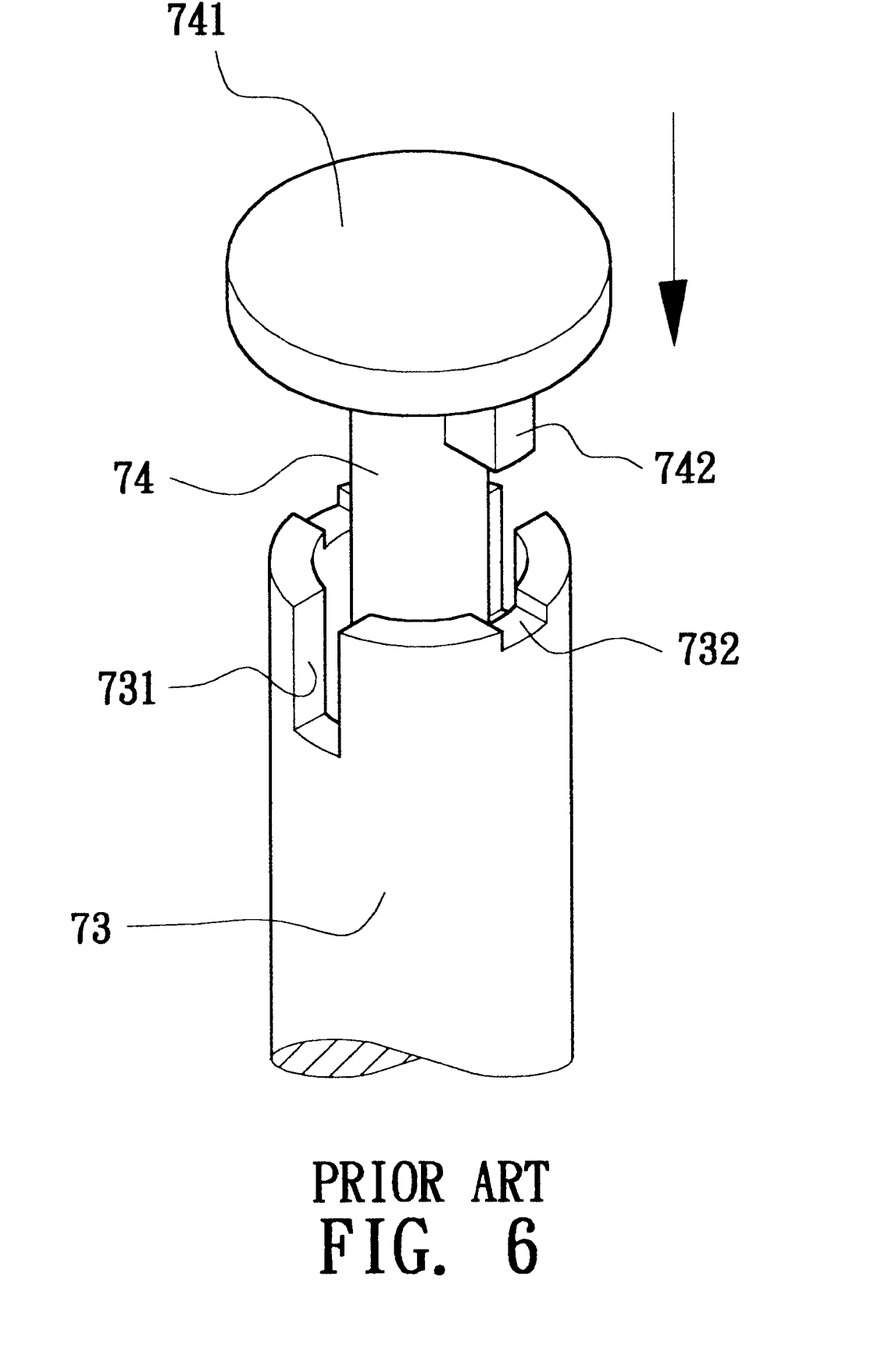
FIG. 6 is a perspective view showing the top end of the tube and the top end of the pull rod of the conventional tea infusion of FIG. 5.

FIGS. 5 and 6 show a conventional tea infusion cup. The tea infusion cup is equipped with two covers 77a, 77b. A partitioning board 71 is disposed in the tea infusion cup to divide the interior of the cup into a first division 78 and a second division 79. The partitioning board 71 is formed with a central draining hole 711.

A mesh rack 72 is disposed above the partitioning board 71. A filtering mesh is paved over the mesh rack 72. The center of the mesh rack 72 has an upward extending tube 73 in which a pull rod 74 is fitted. The top end of the pull rod 74 extends out of the tube 73 and is formed with a holding section 741. The bottom end of the pull rod 74 downward extends out of the tube 73 and is fitted with a spring 75. A valve body 76 is connected with the bottom end of the pull rod 74. In normal state, the valve body 76 is pushed downward by the spring 75 to block the draining hole 711.

In use, a user can place the tea into the first division 78 and infuse the tea with hot water. The cover 77a is then closed to keep the water in the first division 78 having a necessary temperature. After a period of time of infusion, the user needs to turn open the cover 77a and pinch the holding section 741 to pull up the pull rod 74. At this time, a locating plate 742 of the pull rod 74 is separated from a locating slot 731 of top end of the tube 73. Then the pull rod 74 can be turned to locate the locating plate 742 in a locating notch 732. At this time, the valve body 76 is moved upward to unblock the draining hole 711. Under such circumstance, the tea in the first division 78 is permitted to flow through the draining hole 711 into the second division 79. Then, the user can turn the pull rod 74 to make the valve body 76 again block the draining hole 711. Thereafter, the cover 77a is closed and the cup 7 is turned upside down. Then, the other cover 77b is opened for drinking the made tea.

When the tea is soaked in the hot water with the cover 77a closed, the tea will expand and stretch. Under such circumstance, the holding section 741 of the pull rod 74 will be surrounded by the hot tea. When the user turns open the cover 77a to pinch the holding section 741 for pulling up the pull rod 74, the user's fingers are easy to be burnt by the hot tea or hot tea water. Moreover, when pinching the holding section 741 with fingers, the fingers often touch the tea water. This is unsanitary. Therefore, it is necessary to improve the above structure in which the pull rod 74 is used to control blocking/unblocking of the valve body 76.

Figure 7:
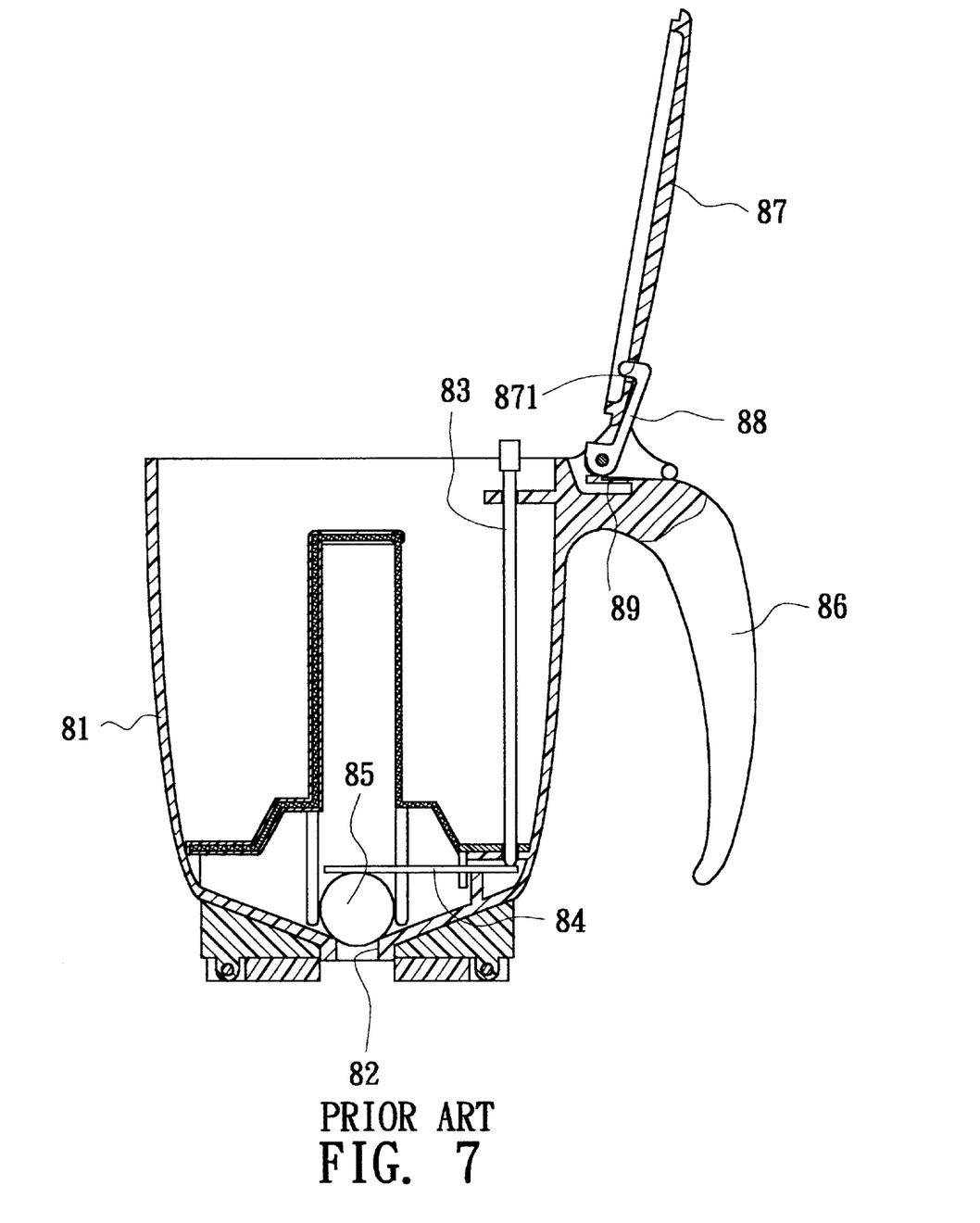
FIG. 7 is a sectional view of a conventional coffee infusion container.

FIG. 7 shows a coffee infusion container. The bottom of the main body 81 of the container is formed with a draining hole 82. The blocking/unblocking of the draining hole 82 is controlled by a controlling mechanism. The controlling mechanism includes a press rod 83, a link 84 and a steel ball 85 fixed at a rear end of the link 84. In normal state, the steel ball 85 will drop down due to gravity to block the draining hole 82. When the press rod 83 is pressed down, the steel ball 85 is driven and lifted by the link 84 to unblock the draining hole 82.

Figure 8:
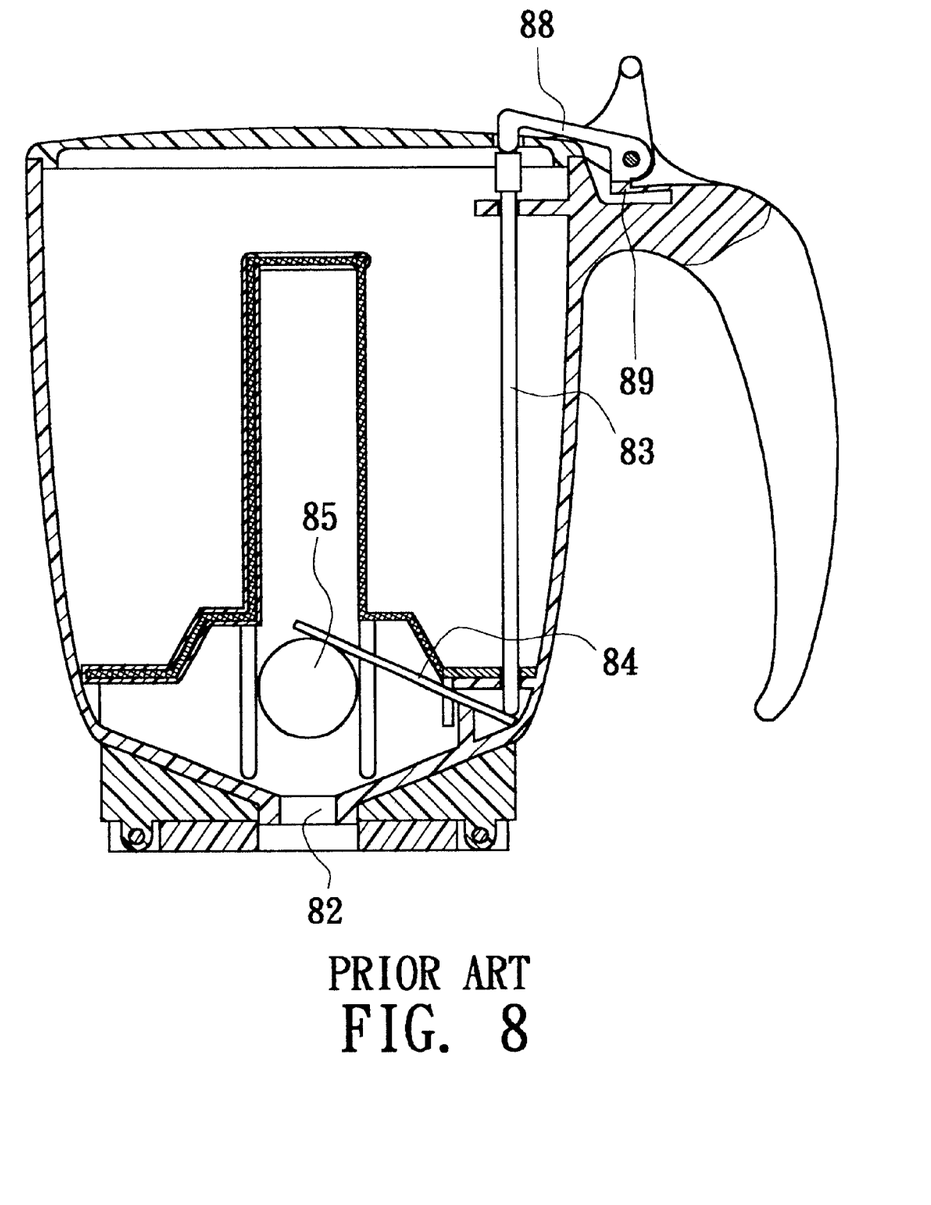
FIG. 8 is a sectional view according to FIG. 7, showing the use of the conventional coffee infusion container.

A switch member 88 is disposed at a pivoted section of the cover 87 pivotally connected with a handle 86 of the container. A leaf spring 89 abuts against and controls the switch member 88. The cover 87 is formed with a through hole 871 corresponding to a rear end of the switch member 88. The rear end of the switch member 88 passes through the through hole 871 and is adapted to contact with the top end of the press rod 83. When the switch member 88 is pressed downward and locked by the leaf spring 89 as shown in FIG. 8, the rear end of the switch member 88 will press down the press rod 83 to unblock the draining hole 82.

The above controlling mechanism can be applied to the double-opening tea infusion cup of FIG. 5 to avoid burn of a user. However, when turning the cup upside down for drinking the tea, the steel ball will drop down due to gravity to again unblock the draining hole. Under such circumstance, the tea water will flow back to the first division or even leak out through the gap between the cover 77a and the container.

SUMMARY OF THE INVENTION

It is therefore a primary object of the present invention to provide a controlling mechanism of beverage infusion container. The controlling mechanism includes a controlling member passed through the circumferential wall of the container. One end of the controlling member extends out of the circumferential wall and is provided with a controlling section. The other end of the controlling member is linked with a valve body positioned at the draining hole of the partitioning board. The valve body is controllable by the controlling section on outer side of the container to block or unblock the draining hole.

The present invention can be best understood through the following description and accompanying drawings wherein:

DETAILED DESCRIPTION OF THE PREFERRED EMBODIMENT

Please refer to FIGS. 1 to 4 which show the controlling mechanism of beverage infusion container of the present invention. The container 1 includes a circumferential wall 10 and has an upper opening 11a and a lower opening 11b. An upper cover 12 and a lower cover 13 are respectively screwed on the upper and lower openings.

Figure 1:
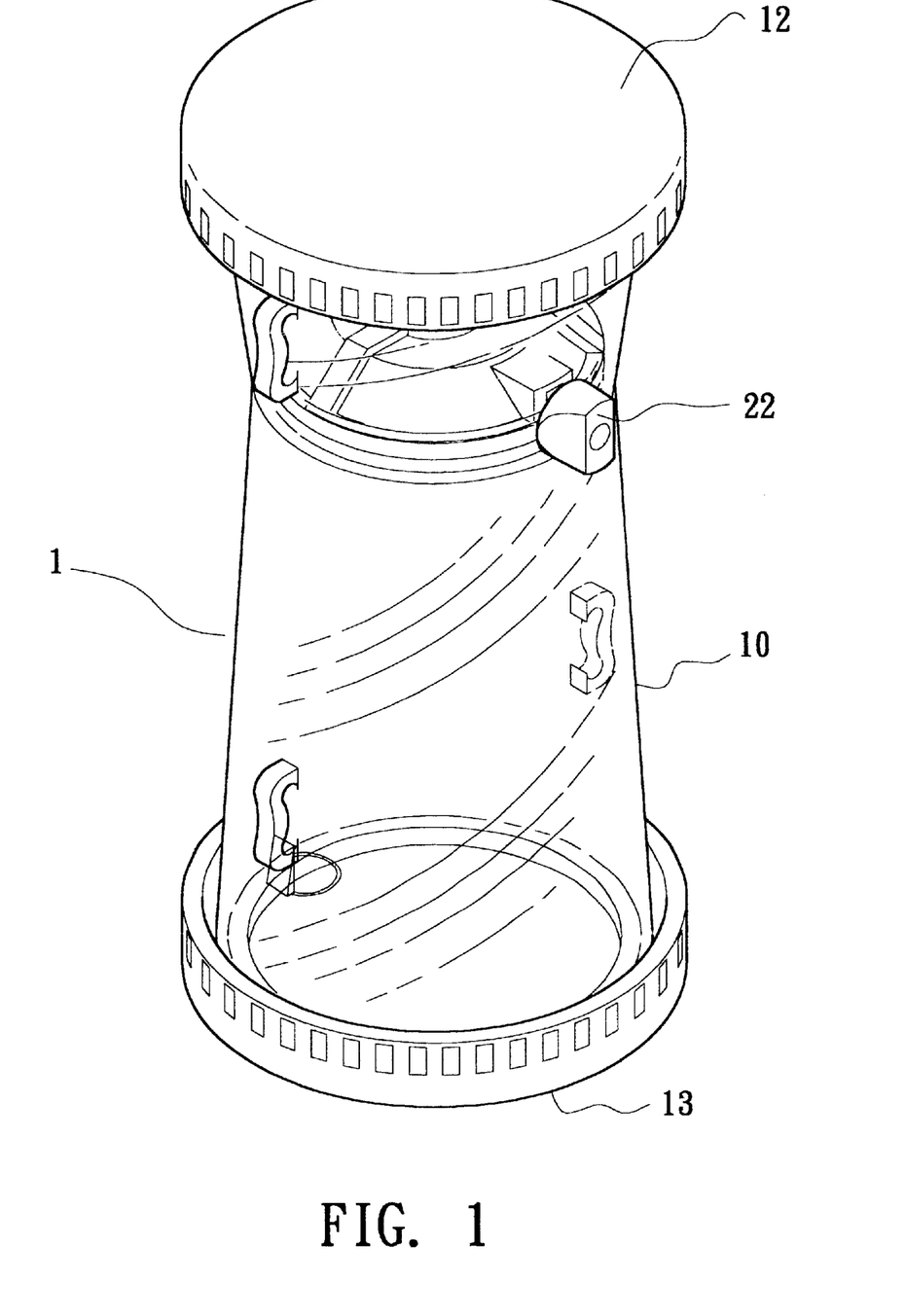
FIG. 1 is a perspective assembled view of the present invention.
Figures 2A, 2B:
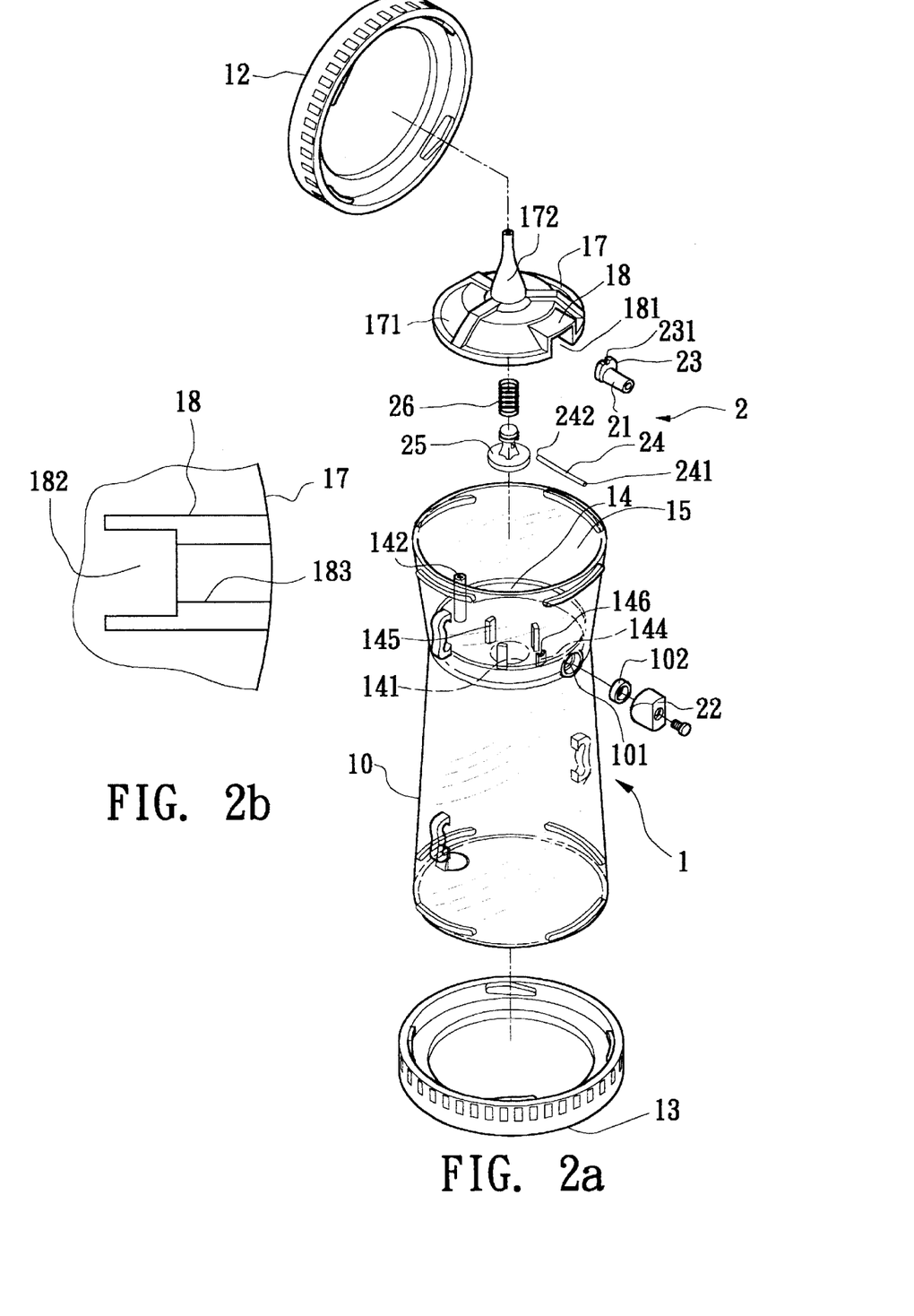
FIG. 2a is a perspective exploded view of the present invention.
FIG. 2b shows the block body of the mesh rack of the present invention.
Figure 3:
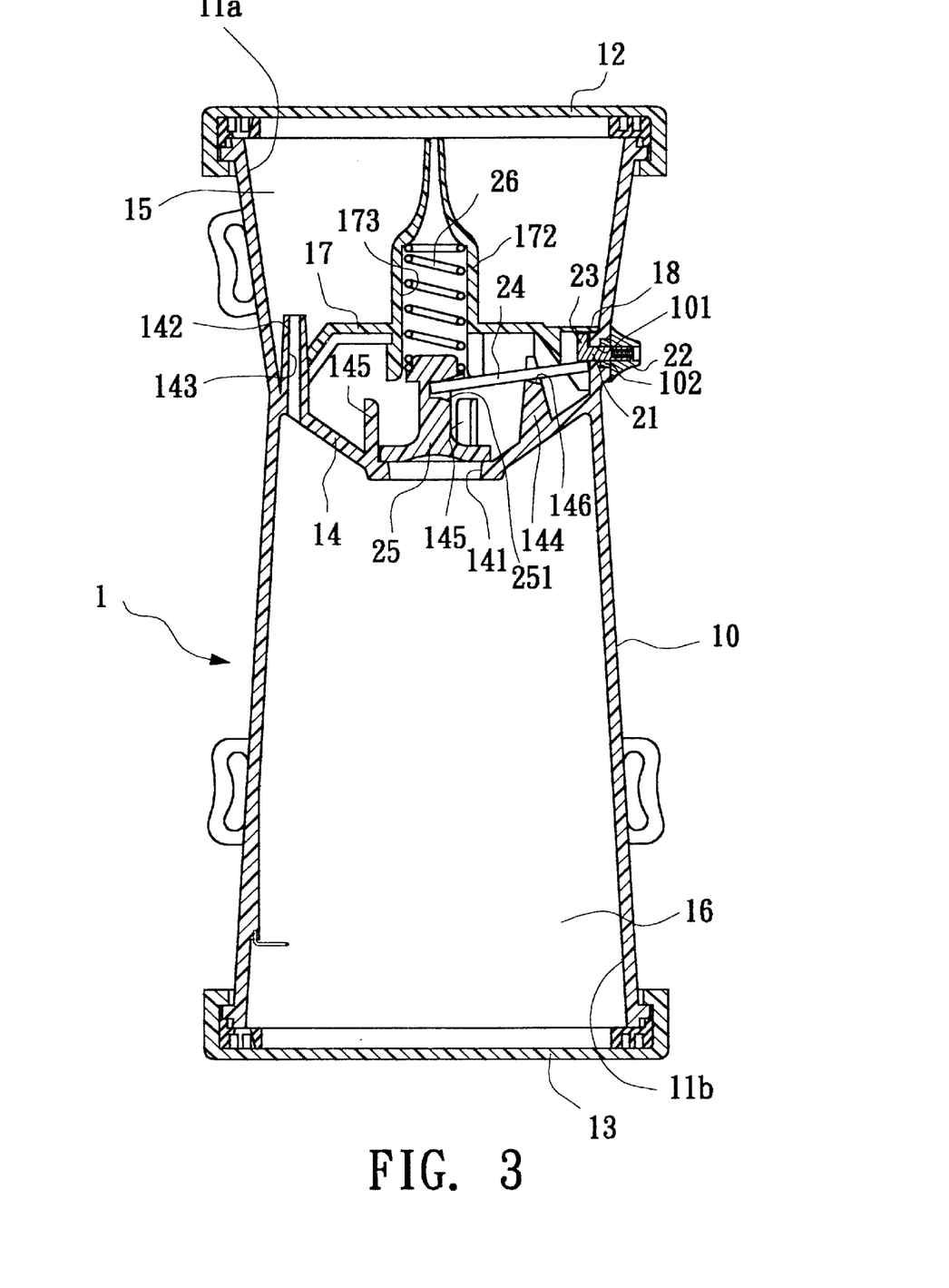
FIG. 3 is a sectional view of the present invention.

A partitioning board 14 is transversely disposed in the container 1 to divide the interior of the container into an upper first division 15 and a lower second division 116. The center of the partitioning board 14 is formed with a draining hole 141 communicating the first and second divisions 15, 16 with each other. A communicating tube 142 is formed on the partitioning board 14 and extends into the first division 15. The communicating tube 142 is formed with a tunnel 143 communicating the first division 15 with the second division 16.

A mesh rack 17 is disposed in the first division 15 to cover the partitioning board 14. A filtering mesh 171 is paved over the mesh rack 17. The center of the mesh rack 17 is formed with an upward extending ventilating tube 172 corresponding to the draining hole 141.

A section of the circumferential wall 10 between the partitioning board 14 and the mesh rack 17 is formed with a through hole 101 communicating with the first division 15. A controlling member of the controlling mechanism 2 is fitted through the through hole 101. In this embodiment, the controlling member is a rod 21. A washer 102 is disposed between the rod 21 and the wall of the through hole 101, whereby the rod 21 is watertight fitted in the through hole 101. One end of the rod 21 extending out of the circumferential wall 10 is provided with a controlling section. In this embodiment, the controlling section is a rotary button 22. The other end of the rod 21 opposite to the rotary button 22 has a radially projecting press block 23. A section of the press block 23 distal from the rod 21 is formed with a notch 231.

The partitioning board 14 is formed with a support block 144 near the press block 23. The support block 144 is formed with a notch 146 in which a link 24 is supported. One end 241 of the link 24 abuts against the press block 23. The other end 242 of the link 24 extends to a valve body 25 disposed at the draining hole 141. The valve body 25 is formed with a socket 251 in which the other end 242 of the link 24 is inserted. A spring 26 is fitted in a large diameter section 173 of the ventilating tube 172 of the mesh rack 17 and positioned on the valve body 25. In normal state, the spring 26 downward pushes the valve body 25 to block the draining hole 141. When turning the rotary button 22, the press block 23 is rotated to press down the link 24. The link 24 drives and lifts the valve body 25 to unblock the draining hole 141.

The partitioning board 14 is formed with multiple abutting plates 145 extending into the first division 15. The abutting plates 145 are arranged corresponding to the profile of the valve body 25 to restrict the moving path of the valve body 25.

The mesh rack 17 is formed with a block body 18 near the controlling mechanism 2. The block body 19 has a hollow section 181 radially passing through the mesh rack 17 and open to lower side. The hollow section 181 and the support block 144 are up and down opposite to each other. The hollow section 191 has a wider section 182 on one side near the draining hole 141 of the partitioning board. The wider section 182 is adapted to accommodate the support block 144 therein. One side of the hollow section 181 near the circumferential wall 10 is formed with a narrower section 183. The link 24 is fitted in the narrower section 183.

Figure 4A:
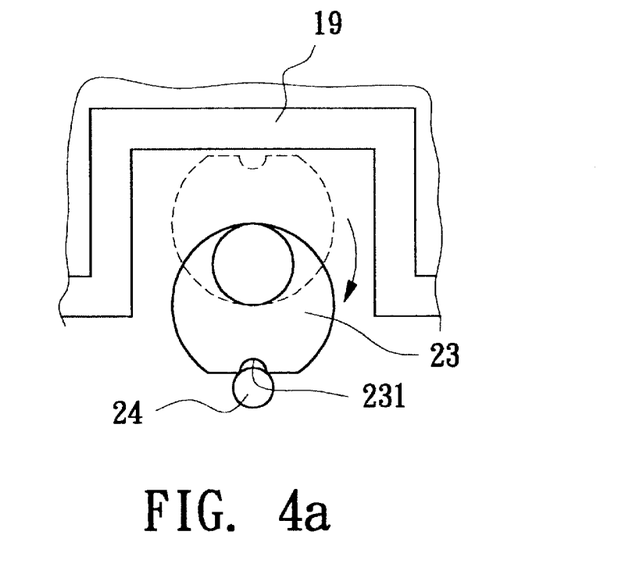
FIG. 4a shows that the rotary button is turned to make the press block press down the link.
Figure 4B:
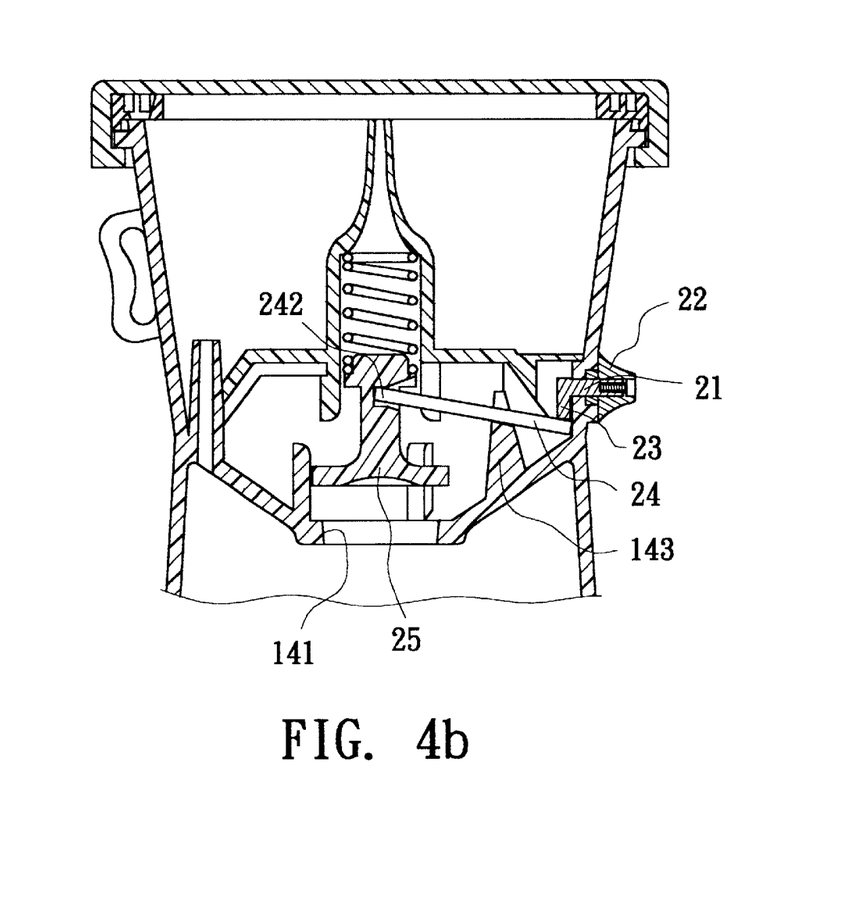
FIG. 4b shows that the rotary button is turned to lift the valve body so as to unblock the draining hole.

In use, the tea is placed into the first division 15 and infused with hot water. Then the upper cover 11a is closed to keep the water temperature in the first division 15. After a period of time of infusion, the rotary button 22 is turned to make the press block 23 rotate and press down the link 24. When the notch 231 is aimed at the end 241 of the link 24, the link 24 is engaged with and located in the notch 231 as shown in FIG. 4a. At this time, the link 24 is supported in the notch 146 of the support block 144 thereunder so that the other end 242 of the link 24 inserted in the valve body 25 is moved upward to lift the valve body 25 to unblock the draining hole 141 as shown in FIG. 4b. Under such circumstance, the tea water in the first division 15 will flow through the draining hole 141 down into the second division 16.

Figure 4C:
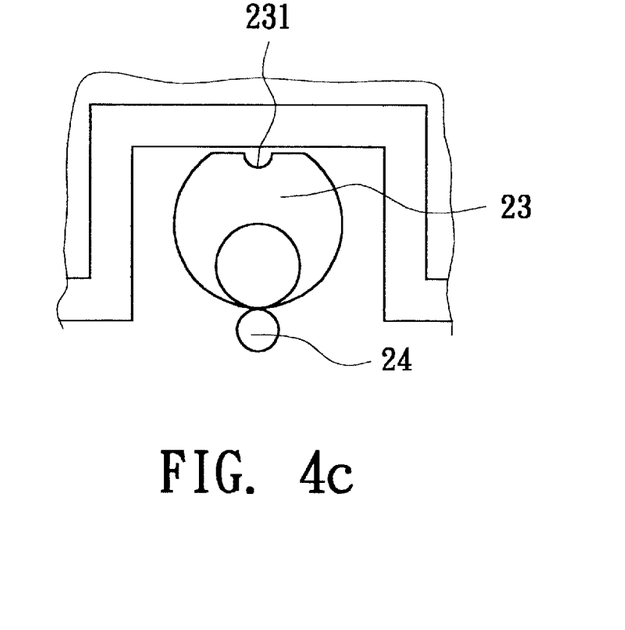
FIG. 4c shows that the rotary button is turned to make the press block no more press down the link.
Figure 4D:
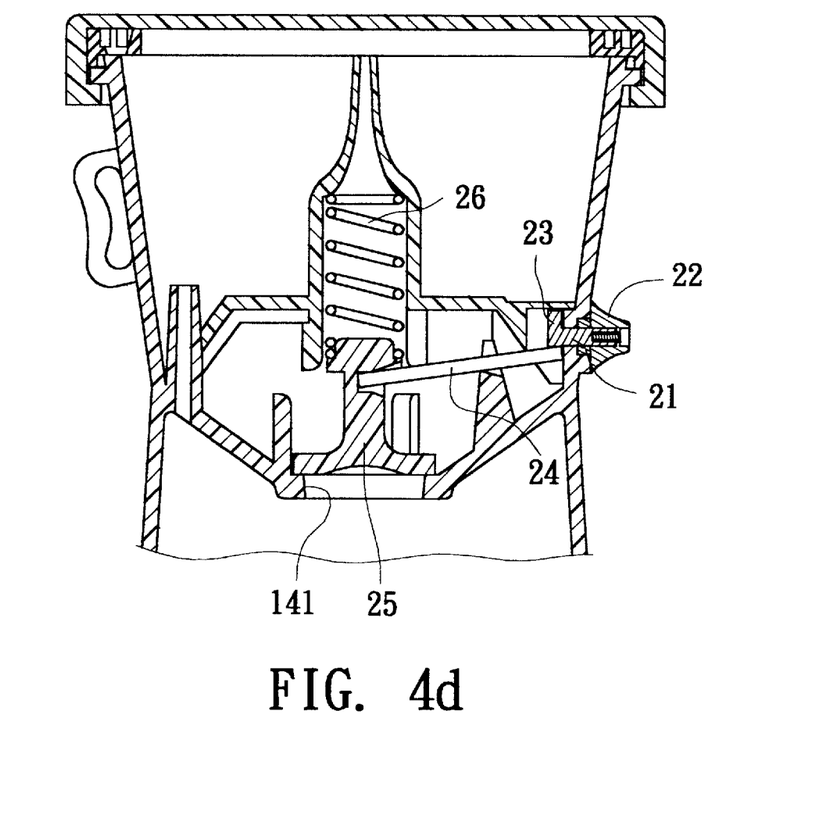
FIG. 4d shows that the spring presses the valve body to block the draining hole.

When it is desired to block the draining hole 141 with the valve body 25, the rotary button 22 is turned to rotate the notch 231 of the press block 23 up to a position opposite to the link 24 as shown in FIG. 4c. At this time, the spring 26 pushes down the valve body 25. Under restriction of the abutting plates 145, the valve body 25 is moved downward to block the draining hole 141 as shown in FIG. 4d.

Then, the container 1 is turned upside down and the lower cover 13 is screwed open for drinking the tea water in the second division 16.

According to the above arrangement, after the hot water is poured into the container and the tea is infused with the hot water, the upper cover 12 can be right away closed to seal the first division 15. When it is desired to unblock the draining hole 141, a user only needs to turn the rotary button 22 on outer side of the circumferential wall 10 of the container 1 to unblock the draining hole 141. In this procedure, it is unnecessary to open the upper cover 12 so that the user's hand will not contact with the tea water. Therefore, the sanitation is ensured and the user's hand is protected from being burnt by the hot tea.

Furthermore, when turning the container 1 upside down, the valve body 25 is pushed by the spring 26 so that the valve body 25 will not drop down and the draining hole 141 is kept blocked by the valve body 25. Therefore, the tea water will not flow back into the first division 15 and leak out.

The above embodiment is only used to illustrate the present invention, not intended to limit the scope thereof. Many modifications of the above embodiment can be made without departing from the spirit of the present invention.

What is claimed is:

1. A controlling mechanism of beverage infusion container having a circumferential wall, said container comprising:

a partitioning board transversely disposed in the container to divide an interior of the container into a first division and a second division, each of the divisions having an opening provided with a cover, the partitioning board being formed with a draining hole communicating the first division with the second division, the blocking/unblocking of the draining hole being controlled by the, controlling mechanism; and a mesh rack in the first division to cover the partitioning board, said controlling mechanism being characterized in that the controlling mechanism includes a controlling member passed through the circumferential wall of the container, one end of the controlling member extending out of the circumferential wall being provided with a controlling section, the other end of the controlling member being linked with a valve body, the valve body being positioned at the draining hole of the partitioning board, whereby the valve body is controllable by the controlling section on outer side of the container to block or unblock the draining hole.

2. The controlling mechanism of beverage infusion container as claimed in claim 1, wherein the circumferential wall of the container is formed with a through hole corresponding to the controlling member, the controlling member being fitted through the through hole, a washer being disposed between the controlling member and the wall of the through hole, whereby the controlling member is watertight fitted in the through hole.

3. The controlling mechanism of beverage infusion container as claimed in claim 1, wherein the controlling section is a rotary button, whereby by means of turning the rotary button, the controlling member can be driven and rotated, the other end of the controlling member opposite to the controlling section having a radially projecting press block, the partitioning board being formed with a support block near the circumferential wall of the container, a link being supported on the support block, one end of the link abutting against the press block, the other end of the link extending to the valve body, the valve body being formed with a socket in which the other end of the link is inserted, a spring being fitted between the valve body and the mesh rack, in normal state, the spring downward pushing the valve body to block the draining hole, whereby by means of turning the controlling member, the press block is rotated to press down the link and the link drives and lifts the valve body to unblock the draining hole, a section of the press block distal from the controlling member being formed with a notch, whereby when the press block is rotated to press down the link, the link is engaged in the notch so as to locate the press block on the link.

4. The controlling mechanism of beverage infusion container as claimed in claim 3, wherein the partitioning board is formed with multiple abutting plates extending into the first division, the abutting plates being arranged corresponding to the profile of the valve body to restrict moving path of the valve body.

* * * * *